(12) United States Patent
Tsujiyama et al.

(10) Patent No.: US 7,462,573 B2
(45) Date of Patent: Dec. 9, 2008

(54) ELASTIC LONG-FIBER NON-WOVEN FABRIC, AND FABRIC PRODUCT USING THE SAME

(75) Inventors: Yoshimi Tsujiyama, Moriyama (JP); Hisanobu Minamizawa, Moriyama (JP); Junji Iwata, Moriyama (JP); Kouichi Hatada, Moriyama (JP)

(73) Assignees: Chisso Corporation, Osaka (JP); Chisso Polypro Fiber Company Limited, Tokyo (JP)

( * ) Notice: Subject to any disclaimer, the term of this patent is extended or adjusted under 35 U.S.C. 154(b) by 384 days.

(21) Appl. No.: 10/366,195

(22) Filed: Feb. 13, 2003

(65) Prior Publication Data

US 2003/0162458 A1   Aug. 28, 2003

(30) Foreign Application Priority Data

| Feb. 20, 2002 | (JP) | ............................. 2002-042920 |
| Dec. 26, 2002 | (JP) | ............................. 2002-378149 |
| Feb. 3, 2003 | (JP) | ............................. 2003-025845 |

(51) Int. Cl.
*D04H 1/00* (2006.01)
*B32B 9/00* (2006.01)
*D02G 3/00* (2006.01)

(52) U.S. Cl. ..................... 442/361; 442/362; 442/363; 442/364; 428/371; 428/373; 428/374

(58) Field of Classification Search .................. 442/329, 442/327, 328, 333, 352, 347, 362–364, 400, 442/394, 381, 319, 268, 361; 428/371, 375
See application file for complete search history.

(56) References Cited

U.S. PATENT DOCUMENTS 5,260,126 A * 11/1993 Collier et al. ............... 442/329
5,425,987 A *  6/1995 Shawver et al. ............. 442/334
6,225,243 B1    5/2001 Austin
6,642,432 B1 * 11/2003 Matsui et al. ............... 604/380
6,677,038 B1 *  1/2004 Topolkaraev et al. ........ 428/370
2002/0098762 A1 *  7/2002 Shelley et al. ............... 442/336

FOREIGN PATENT DOCUMENTS

| JP | 61-194221 | 8/1986 |
| JP | 62-184118 | 8/1987 |
| JP | 9-31751 | 2/1997 |
| JP | 9-291454 | 11/1997 |
| WO | WO 93/07321 | 4/1993 |
| WO | WO 93/15251 | 8/1993 |
| WO | WO 94/25648 | 11/1994 |

* cited by examiner

*Primary Examiner*—Lynda Salvatore
(74) *Attorney, Agent, or Firm*—Hamre, Schumann, Mueller & Larson, P.C.

(57) ABSTRACT

PROBLEM TO BE SOLVED: To provide an elastic long-fiber non-woven fabric that exhibits excellent elasticity, appropriate stress upon elongation, an excellent anti-blocking property, and an excellent soft feel, and which is suitable for applications to fabric products; and to provide fabric products manufactured from such an elastic long-fiber non-woven fabric.

SOLUTION: An elastic long-fiber non-woven fabric comprising composite long fibers comprising at least one of a non-elastomer resin and an elastomer resin, wherein the composite long fibers have a helical structure and an irregular-surface structure; the non-elastomer resin/elastomer resin volume ratio (%) of the composite long fibers falls within a range of 30/70 to 5/95; and the fineness of the composite long fibers is 5 dtex or less; and fabric products manufactured from such an elastic long-fiber non-woven fabric.

12 Claims, 3 Drawing Sheets

FIG. 1

Helical Structure

FIG. 2

Helical structure

FIG. 3

Irregular Surface Structure

FIG. 4

Irregular Surface Structure

FIG. 5

Irregular Surface Structure

FIG. 6

Elastomeric Component

Non-elastomeric Component

FIG. 7

ELASTIC LONG-FIBER NON-WOVEN FABRIC, AND FABRIC PRODUCT USING THE SAME

BACKGROUND OF THE INVENTION

1. Field of the Invention

The present invention relates to an elastic long-fiber non-woven fabric, and to fabric products manufactured from the elastic long-fiber non-woven fabric. More particularly, the present invention relates to an elastic long-fiber non-woven fabric that exhibits excellent elasticity, appropriate stress upon elongation, an excellent anti-blocking property, and an excellent feel, and is suitable for application to fabric products; and to fabric products manufactured from such an elastic long-fiber non-woven fabric.

2. Description of the Related Art

In recent years, elastic non-woven fabrics have been used for various applications, and such applications have continued to grow in number. In particular, utilizing their characteristic of fitting to the body, elastic non-woven fabrics are used, for example, for producing disposable diapers, clothing, caps, bandages, and tapes. Performance characteristics demanded of such applications include excellent elasticity, an appropriate fitting feel (appropriate stress upon elongation), an excellent anti-blocking property, and an excellent feel. For instance, although an elastic non-woven fabric manufactured from solely a polyurethane elastomer exhibits excellent elasticity, it fails to exhibit appropriate fitting, because the non-woven fabric undergoes considerable stress when stretched, thereby exerting strong constriction.

Although an elastic non-woven fabric manufactured from a styrene-ethylene-butylene-styrene block copolymer (SEBS), which is a polystyrene elastomer, is known to be a recyclable elastic non-woven fabric that produces no harmful gas when incinerated, such an elastic non-woven fabric is unsatisfactory in terms of anti-blocking property and feel, because of the tackiness inherent to the resin. Although a melt-blown non-woven fabric manufactured from a resin produced by blending polypropylene with SEBS has been proposed, such a fabric is unsatisfactory in terms of feel and elasticity.

As a bulky elastic non-woven fabric exhibiting good feel, there has been proposed a fusible composite short-fiber non-woven fabric comprising a thermoplastic elastomer, and a low-melting-point fusible non-elastomer having a melting point at least 30° C. lower than the melting point of the thermoplastic elastomer. However, this short-fiber non-woven fabric fails to provide satisfactory feel and anti-blocking property, because the highly adhesive thermoplastic elastomer occupies the greatest area of the fiber surfaces. In addition, when a number of bales are stacked in an unconditioned warehouse or truck in summer weather, blocking between fibers tends to occur, raising a problem of poor workability when the non-woven fabric is unwound (refer to e.g., Patent Reference 1). There has also been proposed a melt-blown non-woven fabric comprising an elastomer material and a non-elastomer material, and partially having crimps (refer to, e.g., Patent Reference 2). Furthermore, there has been proposed a non-woven fabric comprising fibers that have surface irregularity produced by stretching, manufactured from an elastomer material, and a non-elastomer material containing a linear low-density polyethylene (refer to, e.g., Patent Reference 3). However, these non-woven fabrics require further improvement in terms of feel and anti-blocking property.

Patent Reference 1
  Japanese Patent Application Laid-Open No. 9-31751
Patent Reference 2
  Japanese Patent Application Laid-Open No. 6-511047
Patent Reference 3
  Japanese Patent Application Laid-Open No. 2002-522653

Problems to be Solved by the Invention

The object of the present invention is to provide an elastic long-fiber non-woven fabric that exhibits excellent elasticity, an appropriate stress upon elongation, an excellent anti-blocking property, and an excellent soft feel, and which is suitable for applications to fabric products; and to provide fabric products manufactured from such an elastic long-fiber non-woven fabric.

Means to Solve the Problems

The present inventors have carried out extensive studies in an effort to solve the above-described problems. Consequently, the inventors have found that the problems can be solved by an elastic long-fiber non-woven fabric comprising composite long fibers comprising at least a non-elastomer resin and an elastomer resin, wherein the composite long fibers have a helical structure and an irregular-surface structure; the non-elastomer resin/elastomer resin volume ratio (%) of the composite long fibers falls within a range of 30/70 to 5/95; and the fineness of the composite long fibers is 5 dtex or less; as well as fabric products manufactured from such an elastic long-fiber non-woven fabric. The present invention was attained on the basis of these findings.

SUMMARY OF THE INVENTION

The present invention provides:

(1) An elastic long-fiber non-woven fabric comprising composite long fibers comprising at least a non-elastomer resin and an elastomer resin, wherein the composite long fibers have a helical structure and an irregular-surface structure; the non-elastomer resin/elastomer resin volume ratio (%) of the composite long fibers falls within a range of 30/70 to 5/95; and the fineness of the composite long fibers is 5 dtex or less.

(2) The elastic long-fiber non-woven fabric according to (1), wherein the ratio $S_B/S_{50}$ of the breaking strength $S_B$ of the non-woven fabric (converted to a non-woven fabric of a width of 25 mm and a weight per unit area of 100 g/m$^2$) to the strength at 50% elongation $S_{50}$ of the non-woven fabric (converted to a non-woven fabric of a width of 25 mm and a weight per unit area of 100 g/m$^2$) is 4.5 or more, and the rate of elongation recovery after 50% elongation is 50% or more.

(3) The elastic long-fiber non-woven fabric according to (1) or (2), wherein the composite configuration of the composite long fibers is a side-by-side configuration or an eccentric sheath-core configuration.

(4) The elastic long-fiber non-woven fabric according to any of (1) to (3), wherein the helical structure and the irregular-surface structure are formed by stretching of the non-woven fabric.

(5) The elastic long-fiber non-woven fabric according to any of (1) to (4), wherein the elastomer resin is a styrene-ethylene-butylene-styrene block copolymer (SEBS), or a polymer blend containing 50% by weight or more styrene-ethylene-butylene-styrene block copolymer (SEBS); and the non-elastomer resin is at least one member selected from the group consisting of polypropylene and propylene copolymers.

(6) The elastic long-fiber non-woven fabric according to any of (1) to (5), wherein the bending resistance of the non-woven fabric is 20 mm or less.

(7) The elastic long-fiber non-woven fabric according to any of (1) to (6), wherein the strength of the non-woven fabric upon 100% elongation (converted to a non-woven fabric of a width of 25 mm and a weight per unit area of 100 g/m$^2$) is 2 N or less.

(8) The elastic long-fiber non-woven fabric according to any of (1) to (7), wherein the elastic long-fiber non-woven fabric is manufactured by a melt-blowing method.

(9) A laminated non-woven fabric manufactured by laminating the elastic long-fiber non-woven fabric according to any of (1) to (8), and at least one member selected from the group consisting of a film, non-woven fabric, web, woven fabric, knitted fabric, and fiber bundle other than the elastic long-fiber non-woven fabric.

(10) A fiber product manufactured from the elastic long-fiber non-woven fabric according to any of (1) to (8), or the laminated non-woven fabric according to (9).

DETAILED DESCRIPTION OF THE PREFERRED EMBODIMENT

The present invention will be described in detail below.

The elastic long-fiber non-woven fabric of the present invention is an elastic long-fiber non-woven fabric comprising composite long fibers comprising at least a non-elastomer resin and an elastomer resin, wherein the composite long fibers have a helical structure and an irregular-surface structure; the non-elastomer resin/elastomer resin volume ratio (%) of the composite long fibers falls within a range of 30/70 to 5/95; and the fineness of the composite long fibers is 5 dtex or less. By virtue of the helical structure and the irregular-surface structure, the elastic long-fiber non-woven fabric of the present invention exhibits excellent elasticity and appropriate stress upon elongation, as well as an excellent anti-blocking property. Although the helical structure alone can be expected to yield excellent elasticity and appropriate stress upon elongation, in the absence of the irregular-surface structure the anti-blocking property is unsatisfactory. Although the irregular-surface structure alone can yield an excellent anti-blocking property, in the absence of the helical structure excellent elasticity and an appropriate stress upon elongation cannot be expected.

In the present invention, the excellent feel of a non-woven fabric is such that the drape property is good (bending resistance is small), the non-woven fabric imparts high softness when grabbed, and the surface of the non-woven fabric is as soft as downy hair and has a smooth tactile impression.

An elastomer resin is a component for improving the elasticity of a long-fiber non-woven fabric.

In the present invention, the expression "elastomer resin" refers to a resin that at room temperature (10 to 40° C.) exhibits the characteristics of an elastic body, in the manner of vulcanized rubber, by virtue of the presence of a soft segment in the molecule, and that can be molded by use of an existing fiber-forming machine as can ordinary thermoplastic resins, by virtue of melting of a hard segment in the molecule at an elevated temperature. Specifically, an elastomer resin means that a film formed from the resin is stretchable by 25% or more at room temperature (10 to 40° C.), and that the elongation recovery rate is 20% or more when elongation is 25%. Elastomer resins include polystyrene elastomers, polyolefin elastomers, polyester elastomers, polyamide elastomers, and polyurethane elastomers. Among these, polystyrene elastomers, polyolefin elastomers, polyester elastomers, and polyamide elastomers are preferable, from the viewpoint of recycling.

A polystyrene elastomer used in the present invention consists of a copolymer of an aromatic vinyl compound and another co-monomer. The co-monomer is a monomer that can be co-polymerized with an aromatic vinyl compound, and examples of the co-monomer include diene compounds, such as butadiene, isoprene, and chloroprene; and esters of olefins, such as ethylene, propylene, butene, and hexene, (metha) acrylic acid, or esters of (metha) acrylic acid with alcohols, such as methanol, ethanol, butanol, and hexanol.

The polystyrene elastomer used in the present invention is preferably at least one member selected from a group of hydrogenated styrene/diene copolymers consisting of a styrene block copolymer having at least one polymer block (a) comprising mainly aromatic vinyl compounds, and at least one polymer block (b) comprising mainly conjugated diene compounds, wherein at least 80% of double bonds in the conjugated diene portion are saturated by hydrogen; or a random copolymer of an aromatic vinyl compound and a conjugated diene compound, wherein at least 80% of double bonds in the conjugated diene portion are saturated by hydrogen. The word "mainly" used herein means that the quantity of compounds that constitute the polymer block is at least 50% by weight.

Examples of aromatic vinyl compounds that constitute the styrene block copolymer include styrene, α-methylstyrene, vinyltoluene, and p-tert-butylstyrene, of which styrene is particularly preferable. These aromatic vinyl compounds may be used singly or in combination of two or more. Examples of conjugated diene compounds that constitute the styrene block copolymer include 1,3-butadiene, isoprene, 1,3-pentadiene, and 2,3-dimethyl-1,3-butadiene, wherein butadiene and isoprene are particularly preferable. These aromatic vinyl compounds may be used singly or in combination of two or more. In the styrene block copolymer, preferably at least 80% of double bonds in the conjugated diene portion are hydrogenated, in consideration of the stability and spinning property of the compounds. Specific examples of the styrene block copolymers include a styrene-ethylene-butylene-styrene block copolymer (SEBS), a styrene-ethylene-propylene-styrene block copolymer (SEPS), and a styrene-ethylene-butylene-olefin crystalline block copolymer (SEBC). More specific examples of the styrene block copolymers include "KRATON G" from KRATON Polymers Japan, "SEPTON" from Kuraray Co., Ltd., "Tuftec" from Asahi Kasei Corporation, and "JSR DYNARON" from JSR Corporation. (All names in quotation marks are trademarks.)

Examples of conjugated diene monomers that constitute the hydrogenated styrene block copolymer used in the present invention include 1,3-butadiene, isoprene, 1,3-pentadiene, 2,2-dimethylbutadiene, and 3-ethylbutadiene; wherein 1,3-butadiene, isoprene, and 1,3-pentadiene are preferable; and 1,3-butadiene is more preferable. Examples of aromatic vinyl compounds that constitute the hydrogenated styrene block copolymer used in the present invention include styrene, α-methylstyrene, p-methylstyrene, p-ethylstyrene, and vinyl naphthalene; wherein styrene, p-methylstyrene, and p-ethylstyrene are preferable; and styrene is more preferable.

The hydrogenated styrene-diene copolymer is a copolymer of at least one conjugated diene and 3 to 50% by weight of an aromatic vinyl compound, having a molecular weight distribution (Mw/Mn=weight average molecular weight/number average molecular weight) of 10 or less, saturated wherein at least 80% of the olefinic unsaturated bonds of the copolymer have a vinyl-bond, and the content of the diene portion that constitutes the copolymer is 10 to 90% by weight. Specific examples of the hydrogenated styrene-diene copolymers include "JSR DYNARON" from JSR Corporation and the like. (The name in quotation marks is a trademark.)

Examples of polyolefin elastomers used in the present invention are constituted from a random copolymer wherein monomers are randomly arranged; and a block copolymer consisting of a hard segment and a soft segment.

Specific examples of random copolymers of polyolefin elastomers are constituted mainly of hydrogenated diene copolymers. Preferably the hydrogenated diene copolymers consist of a polymer block (c) based on conjugated-dienes that contain a large number of 1,4-bonds, and a polymer block (d) based on conjugated-dienes that contain a large number of 1,2- and 3,4-bonds; and the double bonds of the conjugated dienes are saturated. The conjugated dienes that contain a large number of 1,4-bonds used herein are conjugated dienes whose content of 1,4-bonds exceeds the content of 1,2- and 3,4-bonds. The conjugated dienes that contain a large number of 1,2- and 3,4-bonds are conjugated dienes whose content of 1,2- and 3,4-bonds exceeds the content of 1,4-bonds. The expression "based on conjugated dienes" means that the content of the conjugated dienes is the greatest among the polymer blocks.

The content of 1,4-bonds in the polymer block (c) that constitutes the above-described hydrogenated diene copolymer is preferably 70% by weight or more, more preferably at least 80% by weight. The content of the polymer block (c) that constitutes the hydrogenated diene copolymer is preferably 1 to 99% by weight, more preferably 5 to 65% by weight, particularly preferably 5 to 50% by weight. The total content of 1,2-bonds and 3,4-bonds in the polymer block (d) that constitutes the hydrogenated diene copolymer is preferably more than 25% by weight, more preferably at least 30% by weight. The content of the polymer block (d) in the above-described hydrogenated diene copolymer is preferably 99 to 1% by weight, more preferably 95 to 35% by weight, particularly preferably 95 to 50% by weight.

Although examples of conjugated dienes in the hydrogenated diene copolymers used in the present invention include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene, use of 1,3-butadiene, isoprene, or 1,3-pentadiene is preferable for industrial use and for obtaining hydrogenated diene copolymers that exhibit excellent properties. The hydrogenated diene copolymer is a block copolymer consisting of polybutadiene having a 1,2-bond content of 25% by weight or less serving as the polymer block (c), and a conjugated-diene-based polymer wherein the content of 1,2-bonds and 3,4-bonds in the conjugated diene portions that constitute the hydrogenated diene copolymer is 50% by weight or more, serving as polymer block (d); for example, a hydrogenated diene copolymer having a number average molecular weight of 40,000 to 700,000, wherein 70% or more double bonds of the conjugated portion are saturated, formed from at least one block copolymers selected from a group consisting of a (c)-(d) block copolymer, a (c)-(d)-(c) block copolymer, and block copolymer wherein the above-described block copolymer unit is extended or branches through the residual groups of the coupling agent. Above all, the fiber manufactured from an crystal olefin-ethylene-butylene-crystal olefin block copolymer, known as CEBC, exhibits excellent elasticity, and is particularly preferable. A specific example of CEBC is "JSR DYNARON" from JSR Corporation. (The name in the quotation marks is a trademark.) The crystal olefin-ethylene-butylene-crystal olefin block copolymer may be obtained by use of a phenoxyimine complex catalyst.

The present invention preferably uses a hydrogenated diene copolymer, which is a straight chain or branched block copolymer wherein the polymer block (d) of the hydrogenated diene copolymer is an aromatic vinyl compound/conjugated diene compound copolymer that contains 70% by weight or more conjugated diene compound, and the block structure thereof is represented by (c)-(d-c)n or (c-d)m (n is an integer of 1 or more, and m is an integer of 2 or more). The aromatic vinyl compounds include styrene, α-methylstyrene, p-methylstyrene, t-butylstyrene, divinylbenzene, N,N-dimethyl-p-aminoethylstyrene, N,N-diethyl-p-aminoethylstyrene, and vinylpyridine; with styrene and α-methylstyrene being preferred.

The random copolymer of the polyolefin elastomer used in the present invention is a random copolymer of a hydrocarbon that has a double bond, represented by $C_N H_{2N}$ (N is an integer of 2 or more), such as ethylene, propylene, or butene, with at least one other monomer, especially in the case where the monomers are arranged randomly. The density of the random copolymer of the polyolefin elastomer is preferably 0.850 to 0.920 g/cm³. The density affects elasticity, and if the density is considerably greater than 0.920 g/cm³, the elasticity of the obtained fiber lowers drastically, and thus stress increases drastically.

The random copolymer of the polyolefin elastomer is preferably a copolymer of ethylene with an α-olefin having 3 to 10 carbon atoms, or a copolymer of propylene with an α-olefin having 4 to 10 carbon atoms. Of these, a copolymer of ethylene with an α-olefin having 3 to 10 carbon atoms, exemplified by a copolymer of ethylene with propylene, 1-butene, 3-methyl-1-butene, 4-methyl-1-butene, 1-pentene, 1-hexene, 4-methyl-1-pentene, 1-heptene, 1-octene, 1-nonene, and 1-decene, is more preferable. of the above-described α-olefins, 1-butene, 1-pentene, 1-hexene, and 1-octene are particularly preferable. These α-olefins can be used singly, or in combination of two or more. Ethylene-α-olefin copolymers formed by combining these, such as an ethylene-octene copolymer and ethylene-butene copolymer, are preferable.

The molecular-weight distribution (Mw/Mn) of the copolymer of ethylene with an α-olefin having 3 to 10 carbon atoms, or the copolymer of propylene with an α-olefin having 4 to 10 carbon atoms, is preferably 1.5 to 4, from the viewpoint of spinning property. Specific examples thereof include "Engage" from DuPont-Dow Elastomers Japan Ltd. and "TAFMER" from Mitsui Chemicals, Inc. (Names in quotation marks are trademarks.) The olefin copolymer used in the present invention may be a copolymer manufactured by use of a metallocene catalyst. A terpolymer formed by adding a diene monomer for cross-linking to an α-olefin can also be used, and an ethylene-propylene-diene rubber and an ethylene-butene-diene rubber exemplify such terpolymers.

Elastomeric polypropylene and a propylene-ethylene block copolyer are also preferable. Elastomeric polypropylene is a copolymer having a stereo block structure wherein the polymer chain consists of crystalline isotactic polypropylene or syndiotactic polypropylene, and amorphous isotactic polypropylene, wherein the crystalline isotactic polypropylene or syndiotactic polypropylene constitutes the hard segment and the amorphous isotactic polypropylene constitutes the soft segment. The present invention can use, for example, elastomeric polypropylene disclosed in U.S. Pat. Nos. 4,335, 225, 4,522,982, and 5,188,768.

The above-described propylene-ethylene copolymer is not a copolymer wherein polypropylene and poly(ethylene-co-propylene) are present in a blend state, but is a true block copolymer wherein polypropylene segments are chemically bonded to poly(ethylene-co-propylene) segments, as disclosed in WO 00/23,489. The propylene-ethylene copolymer exemplified in the above-described patent has a weight average molecular weight (Mw) of 100,000 or more, a content of the poly(ethylene-co-propylene) segment of at least 5 but less than 100% by weight, and a total ethylene content of 2 to 95% by weight.

Examples of the polyester elastomers used in the present invention include a polyether-ester block copolymer consisting of a thermoplastic polyester as the hard segment, and a poly(alkylene oxide)glycol as the soft segment. A specific example of such a polyester elastomer is a ternary copolymer consisting of at least one poly(alkymene oxide) glycol selected from the group consisting of copolymers that consist of at least one dicarboxylic acid selected from the group consisting of aromatic dicarboxylic acids, such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethane dicarboxylic acid, and sodium 3-sulfoisophthalate; alicyclic dicarboxylic acids, such as 1,4-cyclohexane dicarboxylic acid; aliphatic dicarboxylic acids, such as succinic acid, formic acid, adipic acid, sebacic acid, dodecane diacid, and dimmer acid; and ester-forming derivatives thereof; at least one diol component selected from the group consisting of aliphatic diols, such as 1,4-butane diol, ethylene glycol, trimethylene glycol, tetramethylene glycol, pentamethylene glycol, hexamethylene glycol, neopentyl glycol, and decamethylene glycol; alicyclic diols, such as 1,1-cyclohexane dimethanol, 1,4-cyclohexane dimethanol, and tricyclodecane dimethanol, and ester-forming derivatives thereof; and copolymers of ethylene glycol having an average molecular weight of about 400 to 5,000; poly(1,2-propylene oxide) glycol, poly(1,3-propylene oxide) glycol, poly(tetramethylene oxide) glycol, a copolymer of ethylene oxide and propylene oxide, and a copolymer of ethylene oxide and tetrahydrofuran.

Examples of the polyamide elastomers used in the present invention include a copolymer of nylon serving as the hard segment and a polyester or a polyether serving as the soft segment. A specific example is a block copolymer of nylon-12 and polytetramethylene glycol.

A typical example of the polyurethane elastomer used in the present invention is a polyurethane elastomer formed from a prepolymer having isocyanate groups at both ends formed by allowing a polyether and/or polyester of a number average molecular weight of 1,000 to 6,000 having hydroxyl groups at the ends to react with a polyisocyanate having an organic diisocyanate as the major component, whose chains are extended by a polyamine containing diamine as the major component.

The non-elastomer resin used in the present invention is a component for improving the feel and anti-blocking property of the long-fiber non-woven fabric. In the present invention, the non-elastomer resin may be any resin, as long as it improves the feel and anti-blocking property. Specifically, there can be used a resin wherein the elongation recovery rate upon 25% elongation of the film formed from the resin is less than 20%, preferably less than 15%.

Examples of the non-elastomer resins used in the present invention include polyesters, polyamides, and polyolefins, wherein polyolefins are preferred, from the viewpoint of feel, cost and formability. Among polyolefins, polypropylene and polyethylene are particularly preferred.

The composite long fiber that constitutes the elastic long-fiber non-woven fabric is preferably at least one selected from a composite long fiber whose elastomer resin is a styrene-ethylene-butylene-styrene block copolymer (SEBS), and a polymer blend that contains 50% by weight or more styrene-ethylene-butylene-styrene block copolymer (SEBS); and whose non-elastomer resin is at least one of propylene or a propylene copolymer. This combination imparts to the elastic long-fiber non-woven fiber excellent elasticity, an appropriate stress upon elongation, an excellent anti-blocking property, and an excellent feel.

The fiber that constitutes the elastic long-fiber non-woven fabric of the present invention is a long fiber. Specifically, a fiber having a length of more than 300 mm is preferable.

Methods for manufacturing the elastic long-fiber non-woven fabric of the present invention include, for example, a method for forming a non-woven fabric by spinning a thermoplastic resin, and stretching, opening, collecting, and entangling (e.g., the spun-bonding method); a method for manufacturing a non-woven fabric by blowing a thermoplastic resin together with high-temperature high-pressure air, and opening and arranging (e.g., the melt-blowing method); and a method for manufacturing a non-woven fabric by drawing and crimping long-fiber bundles of a thermoplastic resin, and opening and widening (e.g., the tow-opening method). Among these, the spun-bonding method and the melt-blowing method are preferable, from the viewpoints of productivity, manufacturing costs, ease of production, and feel; and the melt-blowing method, whereby fibers of high fineness are easily obtained, is particularly preferable. The non-woven fabric can be subjected to surface treatment using a surface-active agent or the like, as required.

The composite long fiber that constitutes the elastic long-fiber non-woven fabric has a non-elastomer resin/elastomer resin volume ratio (%) falling within a range of 30/70 to 5/95, preferably 25/75 to 5/95. If the volume ratio of the non-elastomer resin exceeds this range, the elasticity of the composite long fiber is insufficient; and if the volume ratio of the non-elastomer resin falls below this range, the anti-blocking property of the composite long fiber is insufficient. If the volume ratio of the non-elastomer resin is considerably higher than 30% by volume, the elasticity thereof lowers; and if the volume ratio of the elastomer resin is considerably higher than 95% by volume, the tackiness thereof increases, and the anti-blocking property and feel are adversely affected. When the volume ratio falls within the above-described range, high production stability of the elastic long-fiber non-woven fabric can be attained.

The fineness of the composite long fiber used in the present invention is 5 dtex or less, preferably 0.006 to 2.5 dtex. If the fineness exceeds 5 dtex, softness of the elastic long-fiber non-woven fabric lowers, possibly exerting an adverse effect on the excellent feel thereof.

The elastomer resin and non-elastomer resin used in the present invention may contain any of various stabilizers, a UV absorbing agent, a thickening and branching agent, a delustering agent, a coloring agent, a softness-raising agent such as rubber, and various other additives, in accordance with needs. A specific example of such an additive is titanium oxide added to the non-elastomer resin.

The constituents of the composite long fiber that constitute the elastic long-fiber non-woven fabric of the present invention are at least two components of an elastomer resin and a non-elastomer resin. Although three, four, or more components can be used, two components are sufficient, from the viewpoints of ease in manufacturing the nozzle structure for spinning, manufacturing costs, and productivity.

The composite configuration of the composite long fiber that constitutes the elastic long-fiber non-woven fabric of the present invention is preferably a side-by-side configuration or an eccentric sheath-core configuration, in view of the ease of forming a helical structure and an irregular surface structure by stretching the fiber.

The cross section of the composite long fiber that constitutes the elastic long-fiber non-woven fabric of the present invention may be circular, or may be deformed or hollow, so long as the spinning property is not effected.

The elastic long-fiber non-woven fabric of the present invention preferably exhibits a ratio $S_B/S_{50}$ of the breaking strength $S_B$ (converted to a non-woven fabric of a width of 25 mm and a weight per unit area of 100 g/m$^2$) to the strength at 50% elongation $S_{50}$ (converted to a non-woven fabric of a width of 25 mm and a weight per unit area of 100 g/m$^2$) of 4.5 or more, more preferably 4.5 to 21; and the rate of elongation recovery after 50% elongation is preferably 75% or more, more preferably 80% or more, particularly preferably 90% or more. Breaking strength of a non-woven fabric is the strength of the non-woven fabric when the non-woven fabric is stretched stepwise and breaks. Strength at 50% elongation is the strength attained when the distance between chucks of the measuring instrument is increased to 150% when the non-woven fabric is stretched. For example, if the distance between chucks is 100 mm, the strength at 50% elongation is the strength of the non-woven fabric when the non-woven fabric is stretched by 50 mm. If the strength at 50% elongation is high, when, for example, the non-woven fabric is used in the waist portion of a pants-type disposable diaper, the tightening force becomes strong, thereby constricting the skin causing diaper rash thereby leaving marks on the skin. If the breaking strength is low, when, for example, the non-woven fabric is used in the waist portion of a pants-type disposable diaper, it is easily broken on wearing, and is difficult to use. Therefore, preferably the non-woven fabric exhibits a ratio $S_B/S_{50}$ of the breaking strength $S_B$ (converted to a non-woven fabric of a width of 25 mm and a weight per unit area of 100 g/m$^2$) to the strength at 50% elongation $S_{50}$ (converted to a non-woven fabric of a width of 25 mm and a weight per unit area of 100 g/m$^2$) of 4.5 or more. The elasticity of the non-woven fabric is sufficient if the rate of elongation recovery after 50% elongation is 75% or more.

The elastic long-fiber non-woven fabric of the present invention preferably has a strength at 100% elongation (converted to a non-woven fabric of a width of 25 mm and a weight per unit area of 100 g/m$^2$) of 2 N or less, more preferably 0.5 to 2 N. If the strength at 100% elongation is 2 N or less, when, for example, the non-woven fabric is used in the waist portion of a pants-type disposable diaper, the tightening force does not become sufficiently strong to constrict the skin cause diaper rash leave marks on the skin.

The composite long fiber that constitutes the elastic long-fiber non-woven fabric of the present invention has a helical structure and an irregular surface structure formed by stretching the fiber. The long-fiber non-woven fabric comprising composite long fibers having a helical structure has a density lower than that of the long-fiber non-woven fabric comprising composite long fibers having no helical structure, and is thus bulky and imparts better feel. By virtue of high bulkiness, the heat-retention property is also improved. Since the fiber length between fiber-joining points of the long-fiber non-woven fabric having a helical structure is substantially longer than that of a long-fiber non-woven fabric having no helical structure, it manifests soft feel, and exerts better tightening force. The long-fiber non-woven fabric having a helical structure also exhibits a better anti-blocking property, which will be described later, because of a decrease in the surface contact area of the non-woven fabric.

On the circumference of the composite long fiber that constitutes the elastic long-fiber non-woven fabric of the present invention there is formed an irregular surface structure consisting of a non-elastomer resin. The irregular surface structure lowers the density of the non-woven fabric, and makes the non-woven fabric bulkier. The irregular surface structure also increases the air-retention between fibers, thereby improving the heat-retention property of the non-woven fabric. Furthermore, the irregular surface structure imparts a softer feel. In addition, since the non-elastomer resin is thinly extended, and does not interfere with the extension of the elastomer resin, the elastomer resin is easily stretched, thereby improving the elasticity of the non-woven fabric. The non-woven fabric comprising composite long fibers having an irregular surface structure on the circumference thereof exhibits a better anti-blocking property, which will be described later, by virtue of a decrease in the surface contact area of the fiber.

Further, the elastic long-fiber non-woven fabric of the present invention exhibits better feel, elasticity, and anti-blocking property, by virtue of the synergistic effect of the helical structure and the irregular surface structure of the constituent composite long fiber. Formation of the irregular surface structure in addition to the helical structure improves feel, elasticity, and anti-blocking property on a micro-level on the surface of the fiber.

The content (by number) of long fibers having the helical structure and irregular surface structure among the composite long fibers constituting the elastic long-fiber non-woven fabric of the present invention is preferably 5% or more, more preferably 10% or more, further preferably 15% or more.

The helical structure and irregular surface structure of the composite long fiber can be produced by stretching the composite long fiber. The stretching temperature is preferably a temperature below the melting point or the softening point of the elastomer resin and non-elastomer resin constituting the composite long fiber, more preferably room temperature(10 to 40° C.). The magnification is preferably selected within the range where the composite long fiber does not break, and so as to exceed the elongation at the yield point of the non-elastomer resin. The time for stretching the composite long fiber is selected in accordance with the method employed for manufacturing the elastic long-fiber non-woven fabric, and in the case of the melt-blowing method, stretching is performed after the non-woven fabric has been formed.

Figure 1:
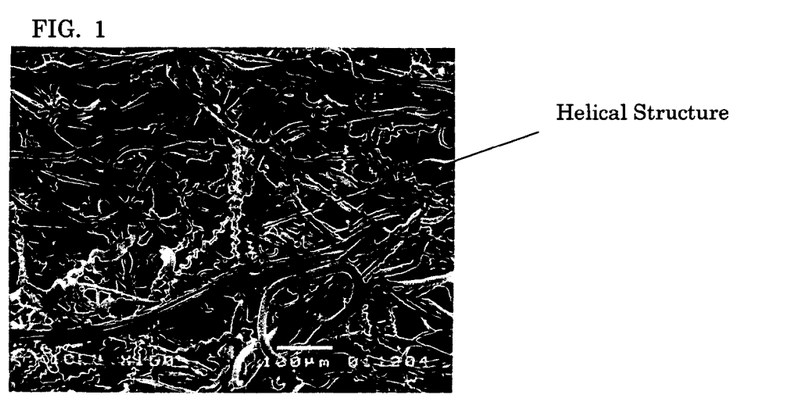
FIG. 1 is an electron micrograph of an example group of composite long fibers having a helical structure and an irregular surface structure, and constituting an elastic long fiber non-woven fabric of the present invention.
Figure 2:
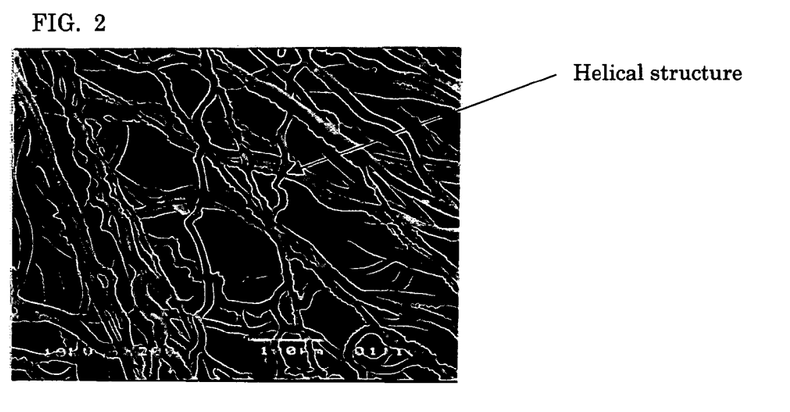
FIG. 2 is an electron micrograph of another example group of composite long fibers having a helical structure and an irregular surface structure, and constituting an elastic long fiber non-woven fabric of the present invention.
Figure 3:
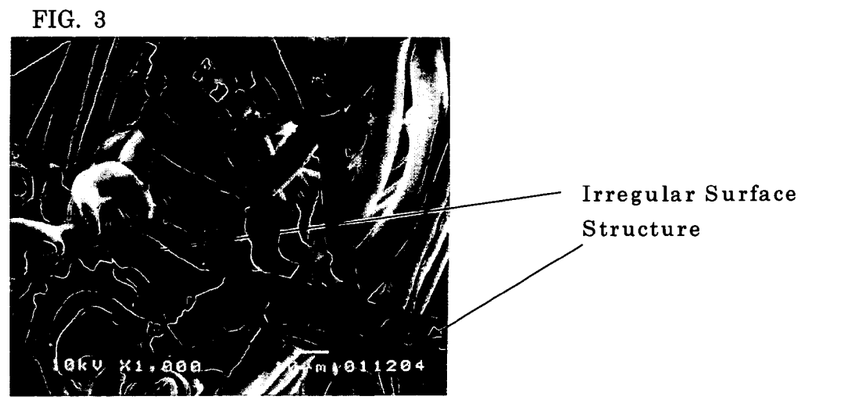
FIG. 3 is an enlarged electron micrograph of an example of the irregular surface structure of long fibers constituting an elastic long fiber non-woven fabric of the present invention.
Figure 4:
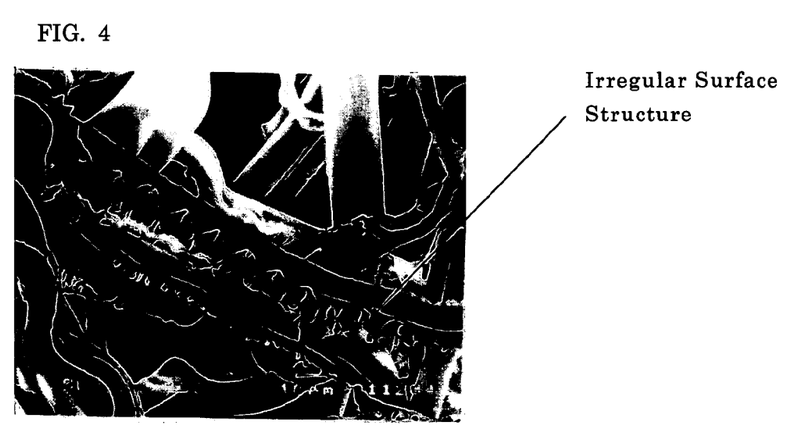
FIG. 4 is an enlarged electron micrograph of another example of the irregular surface structure of long fibers constituting an elastic long fiber non-woven fabric of the present invention.
Figure 5:
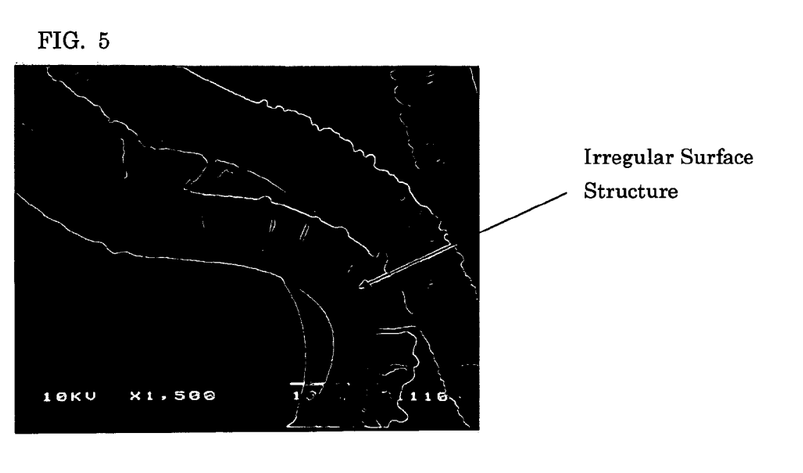
FIG. 5 is an enlarged electron micrograph of another example of the irregular surface structure of long fibers constituting an elastic long fiber non-woven fabric of the present invention.
Figure 6:
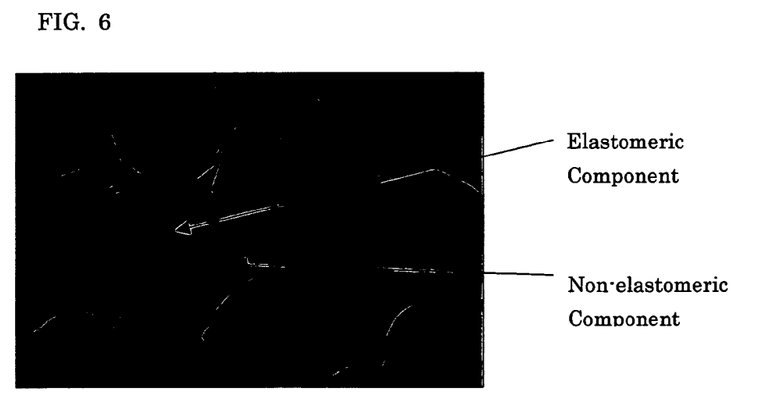
FIG. 6 is an electron micrograph of an example of the cross section of composite long fibers constituting an elastic long fiber non-woven fabric of the present invention.
Figure 7:
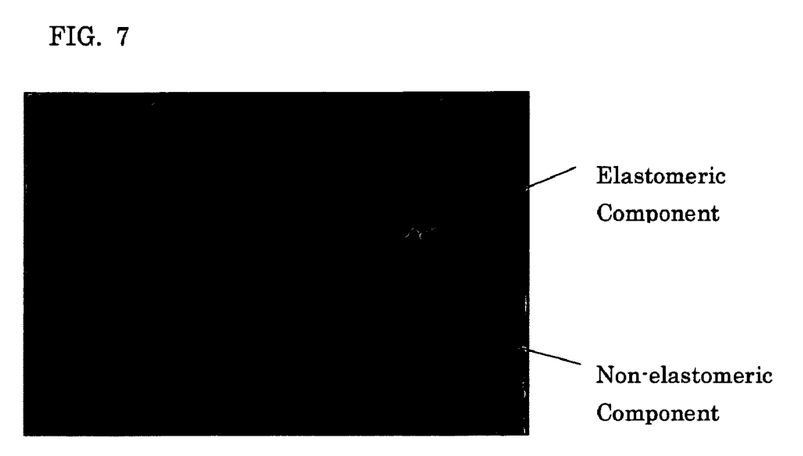
FIG. 7 is an electron micrograph of another example of the cross section of composite long fibers constituting an elastic long fiber non-woven fabric of the present invention.

FIGS. 1 to 5 depict examples of the helical and irregular surface structure of the composite long fiber constituting the elastic long-fiber non-woven fabric of the present invention. FIG. 1 is a micrograph showing the state where the composite fiber has helical structures and irregular surface structures. FIGS. 3 and 4 are enlarged micrographs of the irregular surface structure portions in FIG. 1, where the irregular surface structure portions have a surface structure including multiple bumps thereon. FIG. 2 is a micrograph of another example from FIG. 1 showing the state where the composite fiber has helical structures and irregular surface structures. FIG. 5 is an enlarged micrograph of irregular surface structure portions in FIG. 2, where the irregular surface structure portions have a surface structure including multiple bumps thereon. FIGS. 6 and 7 are enlarged micrograph cross sections of composite long fibers constituting the elastic long-fiber non-woven fabric of the present invention.

In the present invention, a non-elastomer resin is disposed on at least a portion of the surface of the composite long fiber. Although the elastomer resin has inherent tackiness, and may deteriorate the feel and anti-blocking property of the obtained non-woven fabric, the non-elastomer resin has less tackiness than the elastomer resin, and does not deteriorate the feel of the obtained non-woven fabric. Therefore, the presence of the non-elastomer resin on the surface of the fiber improves the feel and anti-blocking property of the obtained non-woven fabric. The circumferential length rate (the percentage of the exposed length of the non-elastomer resin with respect to the circumferential length of the cross section of the fiber cut perpendicular to the long axis) is preferably 1 to 100%, more preferably 5 to 95%, particularly preferably 10 to 80%.

Bending resistance, which serves as an index of softness, of the elastic long-fiber non-woven fabric of the present invention [as measured in accordance with JIS (Japanese Industrial Standards) L 1096 6.19.1A (45° Cantilever Method)] is preferably 30 mm or less, more preferably 25 mm or less, particularly preferably 20 mm or less. Normally the value of the bending resistance increases with increasing weight per unit area of the non-woven fabric, whereby the softness thereof lowers. Although an ordinary non-woven fabric of a weight per unit area of 50 g/m$^2$ encounters difficulty in attaining a bending resistance of 30 mm or less, the elastic long-fiber non-woven fabric of the present invention has a low bending resistance even when the weight per unit area increases, and maintains good feel.

The anti-blocking property is determined by the exfoliation strength of the elastic long-fiber non-woven fabrics from each other, and the exfoliation strength is preferably 1 N (per width of 25 mm) or less, more preferably 0.5 N (per width of 25 mm) or less. If the anti-blocking property is poor, blocking occurs easily between fibers, and the problem of the low workability in reeling out the non-woven fabric arises, for example, when a number of bales (packages of the non-woven fabric) are placed in an unconditioned warehouse or truck for transportation during summer weather.

The elastic long-fiber non-woven fabric of the present invention can be used to manufacture a laminated non-woven fabric by laminating at least one member selected from the group consisting of films other than the elastic long-fiber non-woven fabric, non-woven fabrics, webs, woven fabrics, knitted products, and fiber bundles. Preferably, the materials to be laminated are materials that do not inhibit the elongation of the elastic long-fiber non-woven fabric. Specifically, a composite elastic non-woven fabric manufactured by laminating the material with the elastic non-woven fabric preferably can be stretched by 20% or more. Examples of such materials include non-woven fabrics, nets, films, or the like formed by the melt-blowing method using a thermoplastic elastomer resin, such as polystyrene elastomers, polyolefin elastomers, polyester elastomers, and polyurethane elastomers. Other examples include knitted products and woven fabrics manufactured from fibers formed from a thermoplastic elastomer resin, such as polystyrene elastomers, polyolefin elastomers, polyester elastomers, and polyurethane elastomers. In addition to elastomer materials, other examples include webs, non-woven fabrics, woven fabrics, and knitted products having structural elasticity imparted by crimping or the like. Furthermore, other examples include laminated non-woven fabrics manufactured from webs obtained by the carding method or the air-laid method and laminated by the water-jet method, the point-bonding method, or the through-air method, but the present invention is not limited thereto.

The elastic long-fiber non-woven fabric of the present invention may also be laminated to another such non-woven fabric, and by laminating pieces of the elastic long-fiber non-woven fabrics having different elasticities so as to cause the elasticity to exhibit isotropy or anisotropy, a laminated non-woven fabric that can adjust strength, elasticity, and feel of the non-woven fabric can be manufactured.

An example method for manufacturing an elastic long-fiber non-woven fabric by the melt-blowing method of the present invention will be described below.

A non-elastomer resin and an elastomer resin are fed into the hopper of respective extruders, and melted and kneaded. After the resins are extruded through nozzles for a side-by-side configuration, the resins are brought into contact with a high-speed heated gas flow to form fine fibers, and the fine fibers are collected on a porous support to form a non-woven fabric. The obtained non-woven fabric is subjected to stretching by a factor of 1.2 times to a degree not causing breakage, preferably 1.5 to 3.5 times stretching, more preferably 2.0 to 3.2 times stretching, at 10 to 40° C. in the machine direction (MD) and/or in the cross-machine direction (CD), then relaxed, and is wound by use of a take-up machine so as to obtain a long-fiber non-woven fabric exhibiting excellent elasticity in the direction of stretching.

The helical structure and irregular surface structure of composite long fibers that constitute a long-fiber non-woven fabric are formed by the difference in shrinkage of the elastomer resin and the non-elastomer resin in the stretching process of the non-woven fabric. When the magnification of stretching of the non-woven fabric falls within the above-described range, although the non-elastomer resin shows only plastic deformation and does not return to the state before stretching, the elastomer resin has the ability to return to the state before stretching; therefore, strain occurs in the non-elastomer resin portion, and the helical structure and the irregular surface structure are formed in the fibers. Although the direction of stretching in the non-woven fabric stretching process is not limited to the machine direction, the cross-machine direction, or the direction diagonal to the machine direction, the elasticity dominant direction can be determined by the selection of the stretching direction.

By virtue of the above-described helical structure and irregular surface structure, the elastic long-fiber non-woven fabric of the present invention imparts preferable feel that cannot be obtained from conventional elastic long-fiber non-woven fabrics, and can satisfy consumer needs, particularly in applications involving direct contact with the skin, such as absorbent goods, adhesive plasters, poultices, and masks.

Although no particular limitation is imposed on the weight per unit area of the elastic long-fiber non-woven fabric of the present invention, it is normally 5 to 300 g/m², preferably 10 to 200 g/m², more preferably 30 to 100 g/m².

Depending on applications, one or more processing among point bonding, sonic bonding, water-jet processing, needle punching, and through-air processing may be performed. In particular, a point-bonded non-woven fabric is preferable, because the non-woven fabric stress is improved and fuzz is eliminated. Although no particular limitation is imposed on the point bonding area rate, it is preferably 2 to 30%, more preferably 2 to 25%, further preferably 5 to 20%.

Examples of textile products using the elastic long-fiber non-woven fabric or the laminated non-woven fabric of the present invention include stretchable members for hygiene products, such as stretchable members for disposable diapers, stretchable members for diapers, stretchable members for sanitary goods, and stretchable members for diaper covers; stretchable tapes; adhesive plasters; stretchable members for clothing; interlining clothes for clothing; insulating or heat-retaining materials for clothing; protective clothing; hats and caps; masks; gloves; supporters; stretchable bandages; base clothes for poultices; base clothes for plasters; non-slip base clothes; vibration absorbing materials; finger supporters; various filters, such as air filters for clean rooms, blood filters, and oil-water separating filters; electret filters subjected to electret processing; separators; heat insulators; coffee bags; food packaging materials; various motor vehicle materials, such as ceiling sheets for motor vehicles, soundproof materials, base materials, cushioning materials, dustproof materials for loud speakers, air-cleaner materials, insulator skins, packing materials, bonded non-woven fabric sheets, and door trim; various cleaning materials, such as cleaning materials for copying machines; surface and backing materials for carpets; agricultural sheets; lumber draining materials; members for shoes, such as upper soles for sports shoes; members for bags; industrial sealing materials; wiping materials; and sheets. However, the present invention is not limited thereto.

EXAMPLES

The present invention will be specifically described below with reference to examples and comparative examples; however, the present invention is in no way limited to these examples. The testing methods used in the examples and comparative examples are as follows:

(a) Elongation Recovery Rate

A test piece of a width of 2.5 cm and a length of 20 cm was prepared so that the length direction is the elasticity-prevailing direction (machine direction or cross-machine direction). A tensile tester, Autograph AG-G (Shimadzu Corporation), was used, and the distance between chucks was set to 100 mm and the test piece was fixed. After the test piece was stretched by 50% at a pulling speed of 300 mm/minute, the tester was returned at the same speed until the stress load imparted to the elastic long-fiber non-woven fabric became zero. Immediately thereafter, the test piece was again stretched by 50% at the same speed, and the length stretched when the stress load started again, L mm, was measured. The elongation recovery rate was calculated by the following formula:

Elongation recovery rate at 50% elongation (%)={(50−$L$)/50}×100

(b) Breaking Strength

A test piece having a width of 2.5 cm and a length of 20 cm was prepared so that the length direction is the elasticity-prevailing direction (machine direction or cross-machine direction). A tensile tester, Autograph AG-G (Shimadzu Corporation), was used, and the distance between chucks was set to 100 mm and the test piece was fixed. Breaking strength was recorded as the strength attained when the test piece was stretched at a pulling speed of 300 mm/minute until the non-woven fabric is broken, converted to a weight per unit area of 100 g/m².

(c) Strength at 50% Elongation

A test piece having a width of 2.5 cm and a length of 20 cm was prepared so that the length direction is the elasticity-prevailing direction (machine direction or cross-machine direction). A tensile tester, Autograph AG-G (Shimadzu Corporation), was used, and the distance between chucks was set to 100 mm and the test piece was fixed. Strength at 50% elongation was recorded as the strength attained when the test piece was stretched at a pulling speed of 300 mm/minute until the non-woven fabric is stretched by 50%, converted to a weight per unit area of 100 g/m².

(d) Strength at 100% Elongation

A test piece having a width of 2.5 cm and a length of 20 cm was prepared so that the length direction is the elasticity-prevailing direction (machine direction or cross-machine direction). A tensile tester, Autograph AG-G (Shimadzu Corporation), was used, and the distance between chucks was set to 100 mm and the test piece was fixed. Strength at 100% elongation was recorded as the strength attained when the test piece was stretched at a pulling speed of 300 mm/minute until the non-woven fabric is stretched by 100%, converted to a weight per unit area of 100 g/m².

(e) Feel

A square non-woven fabric of 10 cm×10 cm was prepared. Ten panelists touched the non-woven fabric, each panelist evaluated the feel on a scale of 1 to 10, and the feel was determined by the total score of the ten panelists. The higher the score, the more excellent the feel.

Excellent feel of a non-woven fabric means that the drape property is good, the non-woven fabric exhibits high softness when grabbed, and the surface of the non-woven fabric has a downy soft and smooth tactile impression.

(f) Exfoliation Strength

Two square test pieces of 10 cm×10 cm were prepared. One test piece was overlaid on the other, a square aluminum sheet of 10 cm×10 cm was placed on the test pieces, a total of 5 kg of weights were placed thereon, and the assembly was placed in an oven of a temperature of 50° C. for 24 hours. After being taken out of the oven, the test pieces were cut into strips of 25 mm width, and the exfoliation strength for a width of 25 mm was measured by use of a tensile tester, Autograph AG-G (Shimadzu Corporation) (N=5) was used to determine the exfoliation strength. The lower the exfoliation strength, the better the anti-blocking property.

(g) Fineness of Fiber

A total of five square non-woven fabric pieces measuring 10 mm×10 mm were cut from five arbitrary locations of the elastic long-fiber non-woven fabric, and the surfaces thereof were observed under a scanning electron microscope (NDK, Inc.). The diameters of 20 fibers from each non-woven fabric were measured, and the average diameter of the total of 100 fibers was converted to fineness by reference to fiber density.

(h) Circumferential Length Rate of Non-Elastomer Resin

A long fiber constituting an elastic long-fiber non-woven fabric was cut perpendicular to the length direction of the long fiber, the cross section was observed using a scanning electron microscope (NDK, Inc.), and the circumferential length of the entire fiber and the circumferential length of the non-elastomer component were measured by use of an image processor. The circumferential length of the non-elastomer resin was determined from the percentage of the exposed length of the non-elastomer resin/the circumferential length of the cross section of the fiber (%). The value represents the average value of five fibers.

(i) Presence of Helical Structure

The surface of the elastic long-fiber non-woven fabrics was observed under a scanning electron microscope (NDK, Inc.). The electron microscope was adjusted to a magnification that enables observation of 50 or more long fibers (150× magnification in the case of 1 dtex), and a total of 100 fibers were observed. Non-woven fabric in which 5% or more (by number) of the fibers have helical structures was determined to have a helical structure.

(j) Presence of Irregular Surface Structure of Fiber

The surface of the elastic long-fiber non-woven fabrics was observed under a scanning electron microscope (NDK, Inc.). The electron microscope was adjusted to a magnification that enables observation of 50 or more long fibers (150× magnification in the case of 1 dtex), and a total of 100 fibers were observed. Non-woven fabric in which 5% or more (by number) of the fibers have irregular surface structures was determined to have an irregular surface structure.

(k) Bending Resistance

A test piece having a width of 2.5 cm and a length of 20 cm was prepared so that the length direction is the elasticity-prevailing direction (machine direction or cross-machine direction). The bending resistance of the test piece was measured in accordance with JIS (Japanese Industrial Standards) L 1096. 6.19.1A (45° Cantilever Method).

The abbreviations and components of the materials used in the present invention are as follows:

Non-elastomer resin (Component (A))

A-1: Polypropylene: Chisso Polypro CS3300 (Trademark, Chisso Corporation)

A-2: Propylene-ethylene-butene copolymer (ethylene: 4% by weight, buthene: 2.65% by weight): Chisso Polypro CS3650 (Trademark, Chisso Corporation)

A-3: Polyethylene: KEIYO Polyethy S6900 (Trademark, Chisso Corporation)

A-4: Polyethylene terephthalate: K101 (Trademark, Kanebo, Ltd.)

A-5: Nylon 6: UBE NYLON 1011FB (Trademark, Ube Industries, Ltd.)

A-6: Polyester formed by co-polymerization of an acid component consisting of a mixture of terephthalic acid and isophthalic acid in a mole ratio of 60:40, and a diol component consisting of ethylene glycol and diethylene glycol in a mol ratio of 85:15. The melting point of this polymer is not distinctly detected; however, since it starts softening and flowing around 110° C., the softening point (melting point) of the polymer is considered to be 110° C.

Elastomer resin (Component (B))

B-1: Styrene-ethylene-butylene-styrene block copolymer: KRATON G 1657 (Trademark, KRATON Polymer Japan)

B-2: Crystal olefin-ethylene-butylene-crystal olefin block copolymer: DYNARON 6200P (Trademark, JSR Corporation)

B-3: Hydrogenated styrene-diene copolymer: DYNARON 2324P (Trademark, JSR Corporation)

B-4: Ethylene-octene copolymer: Engage 8200 (Trademark, DuPont Dow Elastomers Japan)

B-5: Mixture of 50% by weight B-1 and 50% by weight B-4

B-6: Thermoplastic polyurethane polymer (A thermoplastic polyurethane polymer having a Shore A hardness of 90, whose soft segment component was formed by polymerizing the following three components: a diol having a molecular weight of 2,000 formed by use of the vat cure method from butane diol, hexane diol, and adipic acid; 4,4'-diphenylmethane diisocyanate (MD1); and 1,4-butanediol. The polymer contained a phenol-based antioxidant in 0.2% by weight and a benzotriazole-based lightfast agent in 0.2% by weight. The melt viscosity of the polymer was 12,000 poise as measured by a flow tester at 190° C.)

B-7: Thermoplastic polyester elastomer: Hytrel 5557M (Trademark, DuPont-Toray Co., Ltd.)

B-8: Thermoplastic polyamide elastomer: PEBAX 2533SNO1 (Trademark, ATOFINA JAPAN K. K.)

B-9: Terephthalic acid-butylene glycol-polytetramethylene glycol copolymer polyester (molecular weight: 2,000). A polyether-ester elastomer formed by block-copolymerizing 38% by weight polybutyrene terephthalate segment and 62% by weight polytetramethylene glycol segment was formed into chips by use of an ordinary method. The melting point of this thermoplastic elastomer was 190° C.

Example 1

A-1 was used as the non-elastomer resin, and B-1 was used as the elastomer resin for the material resins of an elastic long-fiber non-woven fabric. A melt-blown non-woven fabric was manufactured by use of equipment consisting of two extruders each having a screw (30 mm in diameter), heaters, and a gear pump; a spinneret for side-by-side configuration (hole diameter: 0.3 mm, number of holes: 501, effective width: 500 mm); a collecting conveyor equipped with a compressed air generator, an air heater, and a polyester net; and a take-up machine. The non-elastomer resin and the elastomer resin were charged in respective extruders; the material non-elastomer resin and the elastomer resin were heated and melted at 270° C. and 230° C., respectively; the gear pump was set so that the non-elastomer resin/elastomer resin constituting ratio (hereafter described as volume ratio (component (A)/component (B)) became 20% by volume/80% by volume; the molten resin was discharged from the spinneret at a spinning speed of 0.12 g/minute per single hole; and compressed air of a pressure of 98 kPa (gage pressure) heated to 400° C. was blown onto the discharged fibers on the collecting conveyor whose polyester net is traveling at a speed of 1.3 m/minute. The collecting conveyor was installed 25 cm from the spinneret. The blown air was removed with an aspirator provided on the backside of the collecting conveyor. The non-woven fabric conveyed by the collecting conveyor was wound into a roll by use of the take-up machine, and an elastic long-fiber non-woven fabric having a weight per unit area of 80 g/m$^2$ (before stretching) was obtained. Furthermore, the elastic long-fiber non-woven fabric was subjected to three-times stretching at 23° C. in the machine direction and the cross-machine direction, then relaxed, and was wound by use of the take-up machine. Table 1 shows the test results for the obtained elastic long-fiber non-woven fabric (after stretching). The long fibers had a helical structure and an irregular surface structure, and the non-woven fabric exhibited excellent elasticity, appropriate stress upon elongation, excellent anti-blocking property, and excellent feel.

Five pants-type disposable diapers, produced from L-size PAMPERS pants manufactured by Procter & Gamble Far East, Inc. by removing net-like elastic materials on both sides of the waist portions and bonding the obtained elastic long-fiber non-woven fabric, were prepared. These were used for five babies; however, the babies exhibited no residual skin fits or traces of constriction caused by excessive tightening. The disposable diapers exhibited no displacement or slipping down due to insufficient tightening, and no leakage of excrement was observed.

A stretch non-woven fabric having a weight per unit area of 100 g/m$^2$ consisting of three-dimensionally crimped polyolefin staple fibers was prepared, laminated with the elastic long-fiber non-woven fabric of Example 1, and entangled by use of a water jet to form a laminated non-woven fabric. The obtained laminated non-woven fabric was used to produce supporters. Five such supporters were prepared, and wound around the knees of five monitors for 24 hours; however, none of the monitors exhibited residual skin fits or traces of constriction caused by excessive tightening. Also, the supporters exhibited no displacement or slipping down of supporters due to insufficient tightening.

Ten adhesive plasters produced by bonding a cloth (for plasters) whereon a haemostatic agent is applied to the elastic long-fiber non-woven fabric obtained in Example 1 were prepared, and wound around the index fingers of 10 monitors for 24 hours; however, none of the monitors exhibited residual skin fits or traces of constriction caused by excessive tightening. Also, the plasters exhibited no displacement or slipping down due to insufficient tightening.

Ten analgesic plasters produced by applying an analgesic agent to the elastic long-fiber non-woven fabric obtained in Example 1 were prepared, and affixed to the knees of 10 monitors for 24 hours; however, none of the monitors exhibited skin fits or traces of constriction caused by excessive tightening. Also, the plasters exhibited no displacement or slipping down due to insufficient tightening.

Examples 2, 3, and 4

Elastic long-fiber non-woven fabrics were manufactured from the same material resins, and the same manufacturing equipment and processing conditions as in Example 1, except that the gear pump was set such that the volume ratio (component (A)/component (B)) became 5% by volume/95% by volume in Example 2, 10% by volume/90% by volume in Example 3, and 30% by volume/70% by volume in Example 4. The obtained elastic long-fiber non-woven fabrics (before stretching) were subjected to 2.8 times stretching at 23° C. in the machine direction and the cross-machine direction, then relaxed, and were wound by use of the take-up machine. Table 1 shows the test results for the obtained elastic long-fiber non-woven fabrics (after stretching). The long fibers had a helical structure and an irregular surface structure, and the non-woven fabrics exhibited excellent elasticity, appropriate stress upon elongation, excellent anti-blocking property, and excellent feel.

Example 5

Elastic long-fiber non-woven fabric was manufactured from the same material resins, and the same manufacturing equipment and processing conditions as in Example 1, except that a spinneret for eccentric sheath-and-core configuration was employed, and the gear pump was set such that the volume ratio (component (A)/component (B)) became 20% by volume/80% by volume. The obtained elastic long-fiber non-woven fabric (before stretching) was subjected to 3.1 times stretching at 23° C. in the machine direction and the cross-machine direction, then relaxed, and was wound by use of the take-up machine. Table 1 shows the test results for the obtained elastic long-fiber non-woven fabric (after stretching). The long fibers had a helical structure and an irregular surface structure, and the non-woven fabric exhibited excellent elasticity, appropriate stress upon elongation, excellent anti-blocking property, and excellent feel.

Example 6

A-1 was used as the non-elastomer resin, and B-1 was used as the elastomer resin for the material resins of an elastic long-fiber non-woven fabric. A spun-bonded non-woven fabric was manufactured by use of equipment consisting of two extruders each having a screw (40 mm in diameter), heaters, and a gear pump; a spinneret for side-by-side configuration (hole diameter: 0.4 mm, number of holes: 120); an air sucker; an electrostatic opening machine; and a polyester net; a point bonding machine; and a take-up machine. The non-elastomer resin and the elastomer resin were charged in respective extruders; the material non-elastomer resin and the elastomer resin were heated and melted at 270° C. and 230° C., respectively; the gear pump was set such that the volume ratio (component (A)/component (B)) became 20% by volume/80% by volume; the molten resin was discharged from the spinneret at a spinning speed of 0.57 g/minute per single hole; the discharged fibers were introduced in the air sucker; and immediately thereafter, the fibers were opened and collected on the collecting conveyor by 3.3 dtex. The web on the collecting conveyor was charged into the point-bonding machine (land area rate: 15%) whose upper and lower rollers had been heated to a temperature of 90° C., and after processing the non-woven fabric was wound into a roll by use of the take-up machine (adherent area rate: 15%). Thus, an elastic long-fiber non-woven fabric having a weight per unit area of 50 g/m$^2$ was obtained. In the same manner as in Example 2, the obtained elastic long-fiber non-woven fabric (before stretching) was subjected to 2.2 times stretching at 23° C. in the machine direction and the cross-machine direction, then relaxed, and was wound by use of the take-up machine. Table 1 shows the test results for the obtained elastic long-fiber non-woven fabric (after stretching). The long fibers had a helical structure and an irregular surface structure, and the non-woven fabric exhibited excellent elasticity, appropriate stress upon elongation, excellent anti-blocking property, and excellent feel.

Examples 7-17

A-1 to A-5 were used as the non-elastomer resins, and B-1 to B-8 were used as the elastomer resins, and combinations of these resins, as shown in Table 2, were used for the material resins of an elastic long-fiber non-woven fabric. Elastic long-fiber non-woven fabrics were manufactured from the above-described material resins, by use of the same manufacturing equipment and processing conditions, except that the temperature of the extruders was set as described below, in accordance with the material resins. The heating temperature for was 270° C. for A-1, 270° C. for A-2, 220° C. for A-3, 300° C. for A-4, 290° C. for A-5, 220° C. for B-1, 220° C. for B-2, 220° C. for B-3, 220° C. for B-4, 220° C. for B-5, 270° C. for B-6, 270° C. for B-7, and 270° C. for B-8. The obtained elastic long-fiber non-woven fabric (before stretching) was subjected to 2.7 times stretching at 23° C. in the machine direction and the cross-machine direction, then relaxed, and wound by use of the take-up machine. Table 2 shows the test results for the obtained elastic long-fiber non-woven fabric (after stretching). The long fibers had a helical structure and an irregular surface structure, and the non-woven fabric exhibited excellent elasticity, appropriate stress upon elongation, excellent anti-blocking property, and excellent feel.

Comparative Example 1

An elastic long-fiber non-woven fabric was manufactured from the same material resins, and by use of the same manufacturing equipment and processing conditions as in Example 1, except that the gear pump was set such that the volume ratio (component (A)/component (B)) became 50% by volume/50% by volume. The obtained elastic long-fiber non-woven fabric (before stretching) was subjected to three-times stretching at 23° C. in the machine direction and the cross-machine direction, then relaxed, and was wound by use of the take-up machine. Table 3 shows the test results for the obtained elastic long-fiber non-woven fabric (after stretching). The long fibers had neither a helical structure nor an irregular surface structure, and the elasticity and feel of the non-woven fabric were unsatisfactory.

Comparative Example 2

An elastic long-fiber non-woven fabric was manufactured from the same material resins, and by use of the same manufacturing equipment and processing conditions as in Example 1, except that the gear pump was set such that the volume ratio (component (A)/component (B)) became 40% by volume/60% by volume. The obtained elastic long-fiber non-woven fabric (before stretching) was subjected to 2.5 times stretching at 23° C. in the machine direction and the cross-machine direction, then relaxed, and was wound by use of the take-up machine. Table 3 shows the test results for the obtained elastic long-fiber non-woven fabric (after stretching). Although the obtained long fibers had a helical structure, they had no irregular surface structure, and the elasticity and feel of the non-woven fabric were unsatisfactory.

Comparative Example 3

An elastic long-fiber non-woven fabric was manufactured from the same material resins, and by use of the same manufacturing equipment and processing conditions as in Example 1, except that the gear pump was set such that the volume ratio (component (A)/component (B)) became 50% by volume/50% by volume. The obtained elastic long-fiber non-woven fabric (before stretching) was subjected to 1.2 times stretching at 23° C. in the machine direction and the cross-machine direction, then relaxed, and was wound by use of the take-up machine. Table 3 shows the test results for the obtained elastic long-fiber non-woven fabric (after stretching). Although the obtained long fibers had a helical structure, they had no irregular surface structure, and the elasticity and feel of the non-woven fabric were unsatisfactory.

Comparative Example 4

An elastic long-fiber non-woven fabric was manufactured from the same material resins, and by use of the same manufacturing equipment and processing conditions as in Example 1, except that the gear pump was set such that the volume ratio (component (A)/component (B)) became 60% by volume/40% by volume. The obtained elastic long-fiber non-woven fabric (before stretching) was subjected to 2.1 times stretching at 23° C. in the machine direction and the cross-machine direction, then relaxed, and was wound by use of the take-up machine. Table 3 shows the test results for the obtained elastic long-fiber non-woven fabric (after stretching). The long fibers had neither a helical structure nor an irregular surface structure, and the non-woven fabric had a 50%-elongation recovery rate as low as 10%, indicating insufficient elasticity, and the feel thereof was unsatisfactory.

Comparative Example 5

An elastic long-fiber non-woven fabric was manufactured from the same material resins, and by use of the same manufacturing equipment and processing conditions as in Example 1, except that the gear pump was set such that the volume ratio (component (A)/component (B)) became 2% by volume/98% by volume. However, since the quantity of the non-elastomer resin was as extremely low as 2% by volume, distribution spots were produced in the width direction of the non-woven fabric, and the non-woven fabric could not be manufactured stably.

Comparative Example 6

An elastic long-fiber non-woven fabric was manufactured from solely the non-elastomer resin A-1, and by use of the same manufacturing equipment and processing conditions as in Example 1. An attempt was made to stretch the obtained elastic long-fiber non-woven fabric (before stretching) at 23° C. in the machine direction and the cross-machine direction; however, the obtained non-woven fabric was not stretchable, and failed to stretch. Table 3 shows the test results for the obtained elastic long-fiber non-woven fabric. The long fibers had neither a helical structure nor an irregular surface structure, and since no elastomer resins were used, the non-woven fabric had a 50%-elongation recovery rate of 0% (the non-woven fabric broke before 50% elongation), indicating insufficient elasticity.

Comparative Example 7

An elastic long-fiber non-woven fabric was manufactured from solely the elastomer resin B-1, and by use of the same manufacturing equipment and processing conditions as in Example 1. However, since the non-woven fabric could not be manufactured when the pressure of the compressed air was set to 98 kPa (gage pressure), because of shots produced on the fibers, the pressure of the compressed air was set to 69 kPa (gage pressure) for spinning. The obtained elastic long-fiber non-woven fabric (before stretching) was subjected to 2.8 times stretching at 23° C. in the machine direction and the cross-machine direction, then relaxed, and was wound by use of the take-up machine. Table 3 shows the test results for the obtained elastic long-fiber non-woven fabric (after stretching). The long fibers had neither a helical structure nor an irregular surface structure, and since no non-elastomer resins were used, the anti-blocking property and feel of the non-woven fabric were unsatisfactory.

Comparative Example 8

An elastic long-fiber non-woven fabric was manufactured in the same manner as in Example 6, except that the air pressure of the air sucker was adjusted so that the fineness on collecting became 5.2 dtex. Table 1 shows the test results for the obtained elastic long-fiber non-woven fabric (after stretching). Although the obtained long fibers had a helical structure, they had no irregular surface structure, and although the non-woven fabric exhibited high elasticity it exhibited unsatisfactory feel.

Comparative Example 9

A-6 was used as the non-elastomer resin, and B-9 was used as the elastomer resin for the material resins of an elastic long-fiber non-woven fabric. Melt spinning was performed by use of a spinning equipment consisting of two extruders each having a screw (40 mm in diameter), heaters, and a gear pump; a spinneret for concentric sheath—and core configuration (hole diameter: 0.6 mm, number of holes: 60); a cooling system; and a take-up machine consisting of take-up rolls (Godet rolls) and a winder. A kiss roll for applying oil was installed between the take-up rolls and the winder. The material resins were charged in the each extruder; the material non-elastomer resin and the elastomer resin were heated and melted at 270° C. and 270° C., respectively; the gear pump was set such that the volume ratio (component (A)/component (B)) became 20% by volume/80% by volume; the molten resin was discharged from the spinneret at a spinning speed of 5 g/minute per single hole; cooling air of about 15° C. was blown from the cooling system to the discharged fibers; an oil was applied to the fibers by use of the kiss roll so that the single yarns are not fusion-bonded to each other; and the yarn was wound at a speed such that the fineness after spinning became 17 dtex.

The obtained elastic fibers before stretching were subjected to 2.5 times stretching at 23° C.; mechanically crimped with a pushing type crimper; and subjected to relaxation heat treatment at 70° C. A finishing oil was applied to the fibers, and the fibers were cut into short fibers having a length of 64 mm. Thus, composite short fibers having a fineness of 6.6 dtex were obtained. These fibers were charged into a carding machine to form a web, which was subjected to a weak fiber-entangling treatment by needle-punching, and heat-treated at 170° C. for 5 minutes so as to obtain a heat-bonded short-fiber non-woven fabric having a weight per unit area of 200 g/m². The non-woven fabric was subjected to three-times stretching at 23° C. in the machine direction. Table 3 shows the test results for the obtained non-woven fabric. Formation of the spindle-shaped non-elastomer resin on the surface of the fibers of the short-fiber non-woven fabric was checked under a scanning electron microscope. The non-woven fabric had a 50%-elongation recovery rate as low as 47%, indicating insufficient elasticity, and the anti-blocking and feel thereof were unsatisfactory.

Table 1

Table 2

Table 3

Effect of the Invention

The elastic long-fiber non-woven fabric and the laminated non-woven fabric manufactured from such a non-woven fabric according to the present invention exhibit excellent elasticity, an appropriate stress upon stretching, and excellent anti-blocking property and feel, by virtue of a helical structure and an irregular-surface structure of the long fibers that constitute the elastic long-fiber non-woven fabric; and are most suitable for applications as textile products.

TABLE 1

| | | ** | Ex. 1 | Ex. 2 | Ex. 3 | Ex. 4 | Ex. 5 | Ex. 6 |
|---|---|---|---|---|---|---|---|---|
| Non-elastomer resin (A) | | Resin No. | A-1 | A-1 | A-1 | A-1 | A-1 | A-1 |
| Elastomer resin (B) | | Resin No. | B-1 | B-1 | B-1 | B-1 | B-1 | B-1 |
| Volume ratio (resin (A)/resin (B)) | | % by vol. | 20/80 | 5/95 | 10/90 | 30/70 | 20/80 | 20/80 |
| Configuration of composite fibers * | | | S/S | S/S | S/S | S/S | ESC | S/S |
| Circumferential length ratio of resin (A) | | % | 15 | 5 | 13 | 18 | 52 | 17 |
| Presence of helical structure | | | Yes | Yes | Yes | Yes | Yes | Yes |
| Presence of irregular surface structure | | | Yes | Yes | Yes | Yes | Yes | Yes |
| Properties of non-woven fabric | Fineness | dtex | 0.9 | 1.0 | 1.0 | 0.9 | 0.9 | 3.3 |
| | Recovery of 50% elongation | % | 95 | 98 | 97 | 90 | 97 | 94 |
| | Strength at 50% elongation | N/25 mm | 0.3 | 0.8 | 0.5 | 0.4 | 0.4 | 1.2 |
| | Strength at 100% elongation | N/25 mm | 0.5 | 1.6 | 1.1 | 0.7 | 0.7 | 1.8 |
| | Breaking strength | N/25 mm | 7.0 | 5.7 | 6.1 | 8.0 | 6.9 | 11.0 |
| | Breaking strength/strength at 50% elongation | | 23.3 | 7.1 | 12.2 | 20.0 | 17.3 | 9.2 |
| | Exfoliation strength | N/25 mm | 0.2 | 0.4 | 0.3 | 0 | 0.1 | 0.2 |
| | Bending resistance | mm | 16 | 13 | 15 | 18 | 12 | 16 |
| | Feel | | 85 | 95 | 90 | 82 | 97 | 70 |

* S/S = side-by-side configuration; ESC = eccentric sheath-core configuration
** Ex. = Example

TABLE 2

| | | ** | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|
| Non-elastomer resin (A) | | Resin No. | A-1 | A-1 | A-1 | A-1 | A-1 | A-1 | A-1 | A-2 | A-3 | A-4 | A-5 |
| Elastomer resin (B) | | Resin No. | B-2 | B-3 | B-4 | B-5 | B-6 | B-7 | B-8 | B-1 | B-1 | B-1 | B-1 |
| Volume ratio (resin (A)/resin (B)) | | % by vol. | 20/80 | 20/80 | 20/80 | 20/80 | 20/80 | 20/80 | 20/80 | 20/80 | 20/80 | 20/80 | 20/80 |
| Configuration of composite fibers * | | | S/S | S/S | S/S | S/S | S/S | S/S | S/S | S/S | S/S | S/S | S/S |
| Circumferential length ratio of resin (A) | | % | 23 | 12 | 12 | 14 | 25 | 27 | 26 | 15 | 17 | 15 | 15 |
| Presence of helical structure | | | Yes | Yes | Yes | Yes | Yes | Yes | Yes | Yes | Yes | Yes | Yes |
| Presence of irregular surface structure | | | Yes | Yes | Yes | Yes | Yes | Yes | Yes | Yes | Yes | Yes | Yes |
| Properties of non-woven fabric | Fineness | dtex | 1.5 | 1.5 | 1.5 | 1.5 | 2.0 | 1.9 | 1.8 | 1.2 | 1.1 | 1.5 | 1.4 |
| | Recovery of 50% elongation | % | 95 | 95 | 93 | 95 | 96 | 95 | 95 | 95 | 95 | 92 | 93 |
| | Strength at 50% elongation | N/25 mm | 0.4 | 0.4 | 0.4 | 0.4 | 1.6 | 0.7 | 0.6 | 0.5 | 0.3 | 1.2 | 0.7 |
| | Strength at 100% elongation | N/25 mm | 0.7 | 0.7 | 0.7 | 0.7 | 2.9 | 1.1 | 1.0 | 0.9 | 0.5 | 1.9 | 1.0 |
| | Breaking strength | N/25 mm | 7.2 | 7.2 | 7.5 | 7.5 | 28.0 | 11.0 | 9.2 | 7.7 | 6.0 | 12.7 | 12.0 |

TABLE 2-continued

|  |  | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Breaking strength/strength at 50% elongation |  | 18.0 | 18.0 | 18.8 | 18.8 | 17.5 | 15.7 | 15.3 | 15.4 | 20.0 | 10.6 | 17.1 |
| Exfoliation strength | N/25 mm | 0.2 | 0.3 | 0.2 | 0.2 | 0.3 | 0.3 | 0.3 | 0.2 | 0.2 | 0.2 | 0.2 |
| Bending resistance | mm | 16 | 16 | 16 | 15 | 27 | 20 | 19 | 16 | 15 | 16 | 17 |
| Feel |  | 75 | 74 | 74 | 70 | 65 | 72 | 77 | 82 | 81 | 80 | 83 |

\* S/S = side-by-side configuration;
\*\* Ex. = Example

TABLE 3

|  |  |  | \*\* C. Ex. 1 | C. Ex. 2 | C. Ex. 3 | C. Ex. 4 | C. Ex. 5 | C. Ex. 6 | C. Ex. 7 | C. Ex. 8 | C. Ex. 9 |
|---|---|---|---|---|---|---|---|---|---|---|---|
| Non-elastomer resin (A) |  | Resin No. | A-1 | A-1 | A-1 | A-1 | A-1 | A-1 | — | A-1 | A-6 |
| Elastomer resin (B) |  | Resin No. | B-1 | B-1 | B-1 | B-1 | B-1 | — | B-1 | B-1 | B-9 |
| Volume ratio (resin (A)/resin (B)) |  | % by vol. | 50/50 | 40/60 | 50/50 | 60/40 | 2/98 | 100/0 | 0/100 | 20/80 | 20/80 |
| Configuration of composite fibers \* |  |  | S/S | S/S | S/S | S/S | S/S | — | — | S/S | S/C |
| Circumferential length ratio of resin (A) |  | % | 40 | 21 | 42 | 65 | — | 100 | 0 | 17 | 100 |
| Presence of helical structure |  |  | No | Yes | Yes | No | — | No | No | Yes | No |
| Presence of irregular surface structure |  |  | No | No | No | No | — | No | No | No | No |
| Properties of non-woven fabric | Fineness | dtex | 0.9 | 0.9 | 0.9 | 1.3 | — | 0.7 | 3.5 | 5.2 | 6.6 |
|  | Recovery of 50% elongation | % | 66 | 70 | 65 | 10 | — | 0 | 100 | 94 | 47 |
|  | Strength at 50% elongation | N/25 mm | 1.6 | 0.5 | 1.5 | 3.0 | — | — | 2.0 | 1.3 | 1.0 |
|  | Strength at 100% elongation | N/25 mm | 2.1 | 1.0 | 2.0 | 4.0 | — | — | 4.0 | 1.8 | 2.7 |
|  | Breaking strength | N/25 mm | 13.2 | 10.0 | 13.0 | 5.0 | — | 4.2 | 5.0 | 12.1 | 6.0 |
|  | Breaking strength/strength at 50% elongation |  | 8.3 | 20.0 | 8.7 | 1.7 | — | — | 2.5 | 9.3 | 6.0 |
|  | Exfoliation strength | N/25 mm | 0 | 0 | 0 | 0 | — | 0 | 4.5 | 0.2 | 3.7 |
|  | Bending resistance | mm | 24 | 23 | 25 | 45 | — | 42 | 30 | 24 | 32 |
|  | Feel |  | 52 | 42 | 47 | 30 | — | 30 | 30 | 53 | 33 |

\* S/S = side-by-side configuration; S/C = concentric sheath-core configuration :
\*\* C. Ex. = Comparative Example

What is claimed is:

1. An elastic long-fiber non-woven fabric comprising composite long fibers comprising at least a non-elastomer resin and an elastomer resin, wherein the composite long fibers have a helical structure and a surface structure including multiple bumps thereon; the helical structure and the surface structure are formed by a difference in shrinkage of the elastomer resin and the non-elastomer resin in a stretching process of the non-woven fabric; the non-elastomer resin/elastomer resin volume ratio (%) of the composite long fibers fails within a range of 30/70 to 5/95; and the fineness of the composite long fibers is 5 dtex or less.

2. The elastic long-fiber non-woven fabric according to claim 1, wherein the ratio $S_B/S_{50}$ of the breaking strength $S_B$ (converted to a non-woven fabric of a width of 25 mm and a weight per unit area of 100 g/m$^2$) to the strength at 50% elongation $S_{50}$ (converted to a non-woven fabric of a width of 25 mm and a weight per unit area of 100 g/m$^2$) is 4.5 or more, and the rate of elongation recovery after 50% elongation is 50% or more.

3. The elastic long-fiber non-woven fabric according to claim 1, wherein the composite configuration of the composite long fibers is a side-by-side configuration or an eccentric sheath-core configuration.

4. The elastic long-fiber non-woven fabric according to claim 1, wherein the elastomer resin is a styrene-ethylene-butylene-styrene block copolymer (SEBS) and the non-elastomer resin is at least one selected from the group consisting of polypropylene and propylene copolymers.

5. The elastic long-fiber non-woven fabric according to claim 1, wherein the strength of the non-woven fabric upon 100% elongation (converted to a non-woven fabric of a width of 25 mm and a weight per unit area of 100 g/m$^2$) is 2 N or less.

6. The elastic long-fiber non-woven fabric according to claim 1, wherein the elastic long-fiber non-woven fabric is manufactured by a melt-blowing method.

7. A laminated non-woven fabric manufactured by laminating the elastic long-fiber non-woven fabric according to claim 1, and one member selected from the group consisting of a film, non-woven fabric, web, woven fabric, knitted fabric, and fiber bundle other than said elastic long-fiber non-woven fabric.

8. A fiber product manufactured from the elastic long-fiber non-woven fabric according to claim 1.

9. A fiber product manufactured from the laminated non-woven fabric according to claim 7.

10. The elastic long-fiber non-woven fabric according to claim 1, wherein the long fiber has a length greater than 300 mm.

11. The elastic long-fiber non-woven fabric according to claim 1, wherein the volume ratio is from 25/75 to 5/95.

12. The elastic long-fiber non-woven fabric according to claim 1, wherein the multiple bumps are formed on the composite tong fibers perpendicularly to a longitudinal direction of the composite long fibers.

* * * * *